United States Patent Office 3,425,577
Patented Feb. 4, 1969

3,425,577
CLOSED-CELL CERAMIC ARTICLE AND METHOD
John R. Copley, Canton, and William R. Cuming and Paul E. Rowe, Sharon, Mass., assignors to Emerson & Cuming, Inc., Canton, Mass., a corporation of Massachusetts
No Drawing. Filed Nov. 30, 1964, Ser. No. 414,895
U.S. Cl. 215—1     6 Claims
Int. Cl. B65d *1/00;* B29f *5/00;* C03c *3/08*

ABSTRACT OF THE DISCLOSURE

A method of manufacturing a non-porous article particularly suitable for use as a container of food to be subjected to microwave radiation and the article made by that method. In practicing the method, hollow, spherical glass particles are mixed with water or other solvent, compacted into a relatively fragile mass, formed into a desired shape and then fired to a point above the softening point of the material at which the particles coalesce to form individual large closed cells bonded together to form a non-porous conglomerate.

---

This invention relates in general to closed-cell ceramic foams and in particular to non-porous articles composed of such ceramics and a method of making such articles.

A considerable market exists for closed-cell ceramics if these materials can be made inexpensively and if they possess certain desirable qualities. First, there are a number of applications for buoyant structures for which closed-cell ceramics are particularly well adapted. The fact that they can be made of non-corroding relatively inert materials of low density makes them most useful in sea water, for example. Also, they are well-suited to thermal insulating and electrical insulating applications. Specifically, they are most useful as wave guide windows, as containers for liquefied gases, as dielectric components in electrical devices and in numerous other applications.

Recently, however, a need has arisen for lightweight, non-porous food containers for use with microwave heating systems. To fill such a need properly, the food containers would necessarily be of a quality and appearance heretofore considered to be incapable of achievement at any reasonable cost. First, and most important, a container destined to hold food products in a raw, partly cooked or completely cooked state must be non-porous in order that the juices and other liquid matter may not permeate the container.

Second, if the container is to be used in serving the food as well as in the cooking or heating operation, it must be attractive enough in appearance to be placed upon the table. At the same time, it should also be cheap enough to be discarded after a single use. Obviously too, the material of which the container is made must be inert to avoid any possible problems of reaction with the food or other influence upon the food which might spoil or affect the taste of the food.

Third, insofar as the cooking or heating of the food by microwave is concerned, the container material must be of a dielectric constant and loss factor of the proper value to insure the heating of the food rather than the container when the microwave heating is applied. It can be shown that the dielectric constant should be below 3.0, and the loss tangent below 0.02 when conventionally used microwave radiation of frequencies from about $10^9$ to $10^{10}$ c.p.s. is the source of heat, if problems such as that outlined are to be avoided.

There have been available commercially some closed-cell ceramic materials for some years. Generally, they are used in the building trades for thermal insulation. However, they are totally unsuited for applications such as food containers. The principal fault which they exhibit is that of high dielectric losses. The loss tangents run above 0.02 with the result that the container will heat in preference to the food which it carries under microwave radiation.

Another ceramic type of material has been proposed for a food container. It is a material which is prepared by bonding glass spheres with clay, sodium silicate, or other inorganic cement. The process of bonding the glass spheres to the inorganic materials results in a porous open-cell ceramic foam in which the original shape and identity of the glass spheres are retained. The material produced is essentially a ceramic having a filler of glass spheres. The porosity of the material is so great as to prevent its widespread use as a food container.

The present invention has as its primary object the conversion of hollow glass particles or spheres into a single, chemically homogenous, ceramic material which is non-porous, glazed throughout and exhibits low dielectric constant and low loss tangent.

Another object of the present invention is the production of non-porous food containers having electrical characteristics suitable for microwave heating and physical characteristics suitable for the serving of food.

Another object of the present invention is the reduction of cost of closed-cell ceramic articles, even to the point where they may be discarded after a single use.

A further object of the present invention is the simplification of the manufacture of closed-cell ceramic articles without the loss of attractive appearance.

In general, the present invention stems from the discovery that individual glass particles or spheres can be subjected to treatment, particularly a firing schedule, in which they may be coalesced to form a material which is uniquely valuable for the manufacture of food containers, but which is also useful in numerous other environments. The material, porous at an early stage, is rendered completely non-porous and is glazed throughout by firing it at a temperature falling within certain reasonably well-defined limits.

Suitable raw materials for use in this invention are found in United States Patent No. 2,797,201 to Veatch et al. These materials are grouped in a category defined as "film-forming materials" and from which, by following the teaching of the cited patent, hollow spherical particles may be obtained. These spherical members are identified in the patent by the trademark Microballoons. Similar spherical particles are identified elsewhere by the trademark Eccospheres. In the present invention, it is contemplated that not all spherical particles disclosed in the cited patent be used, but only inorganic materials disclosed in that patent and elsewhere be used. For a better understanding of the present invention, together with further objects, advantages and features, reference should be made to the following detailed description of preferred embodiments and examples.

In practicing the present invention, it is preferred that inorganic spherical particles such as those identified as Eccospheres R first be blended with water, steam, or other fluid until the mixture is evenly damp. The damp mixture is then compacted, for example, by packing it into a mold and subjecting it to pressure while heat is applied. The volume of the material decreases during the heat-pressure operation, and the precise amount of the decrease may be controlled by a preset stop on the mold. In this fashion, the ultimate volume of the molded material is also controlled.

The mold is permitted to cool, and the compacted piece is then removed. The material at this point remains quite porous, but is sufficiently strong to withstand some handling and simple machining. The molded piece is then deposited in a kiln. The kiln is usually operated at a temperature between the softening point and the working point of the material used. In the case of Eccospheres R, the softening point is about 1100° F. and the working point is about 1800° F.

By way of definition, the softening point is that point at which the material from which the hollow spherical particles are made has a viscosity of approximately $10^{7.6}$ poises. The working point is the temperature at which the material has a viscosity of about $10^4$ poises. Working point is a general term employed by glass manufacturers. For present purposes, it is employed as defined on page 13 of a Corning Glass Works Bulletin (Properties of Selected Commercial Glasses, Corning Glass Works, 1957). Reference should be made to ASTM Designation C 338-54 T as a standard and authoritative basis for the definition of the softening point.

The foregoing viscosities apply when relatively slow firing schedules are employed. However, when relatively fast firing schedules such as might be employed if the material were to be shaped in a mold or if the process were to be automated, a temperature at the working point of the glass corresponding to a viscosity of $10^{2.5}$ poises may be employed. Under these circumstances, a relatively quick cooling of the material may be employed.

For best results, however, it preferred to follow a relatively slow firing schedule in which the temperature is maintained between the softening point and the working point of the material until the particles coalesce to form individual larger cells. In this process, although each larger cell maintains its integrity and there is no intercommunication between cells, the cells are bonded together to form a conglomerate mass.

The material is then permitted to cool and is removed from the kiln. Depending upon its intended ultimate use, the material may, if necessary, be machined to any desired shape. If a food container such as a dish is to be made, glazing and decoration may follow. The final product is non-porous, may have a density of any reasonable value, but certainly between 10 and 100 pounds per cubic foot, and exhibits electrical qualities which render it useful in many environments. Typical electrical properties are dielectric constant below 3.0 and loss tangent below 0.02 at microwave frequencies ($10^9$ to $10^{10}$ cycles per second). Moreover, these values do not change substantially even after submersion in water, since the material is non-porous and thus does not absorb water.

As is explained in the above-cited patent to Veatch et al., the hollow spherical particles forming the raw material and in the present invention contain a certain amount of "blowing agent." Because of the presence of blowing agent, aging of the particles and the conditions under which they are stored have a definite effect upon the final product. Because the particles lose blowing agent during storage, the density of the final product tends to increase with the age of the particles.

The firing temperature, which is critical to the achievement of a non-porous, closed-cell final product, is also a factor in density of that product. With relatively fresh particles of, for example, borosilicate glass, substantially complete non-porosity is obtained with minimum density in a piece by a slow firing at about 1300° F. With increasing firing temperatures above the 1300° F., density increases until a density approaching that of solid material is reached around 1700° F.

The general process described above, as well as the specific examples which appear below all contemplate the use of water in the molding step. Water is used not only because it is the most obvious available fluid, but also because a certain amount of the material of which the spheres are made goes into solution when the particles are mixed with water. Then, adherence of particle to particle occurs upon drying with the dissolved matter acting as a bonding agent. However, rather than water or steam, other substances may be used. These include resins such as silicones or epoxies which will bond glass to glass and which are essentially converted to gas with or without an inorganic residue at temperatures below the range of softening temperature of the material as defined elsewhere in this specification.

When such alternative substances are used, they may be coated upon the particles in the form of low viscosity solutions, they may be applied as powders, or they may be mixed with the particles in other conventional ways. The technique then differs slightly from that where water is used in that the solvent is evaporated until the coated surfaces are tacky, permitting the particles to be molded into a block. Other materials may be substituted for water including low molecular weight alcohols and ketones, and sodium silicate, silica sol or ethyl silicate.

A few specific processes embodying the present invention are the following:

EXAMPLE 1

(A) Screen 860 grams of 150 to 200 mesh borosilicate Eccospheres R and age for one week under ambient conditions.

(B) Sprinkle water onto the Eccospheres R and blend the mixture by hand. This operation is continued until the Eccospheres R are damp enough not to fluff into the air when mixed mechanically.

(C) Attach the container of the mixture to a mixer such as a Hobart mixer which is then operated at a very slow stirring speed. Add water over a period of five minutes until the total weight of water in the mixture is 117 grams. Blend the mixture for about thirty minutes, at which point all lumps are usually broken up and the mixture is uniformly damp.

(D) Mold the mixture by packing it into a 9" x 9" x 3" steel mold which has been released with silicone oil and in which the upper and lower faces of the mold are separated from the mixture by Teflon sheets.

(E) Place the loaded mold in a press and apply to it a pressure of about 320 p.s.i.

(F) Heat the platens of the press to 375° F. for eight hours while pressure is maintained. During this period the upper mold face will sink slowly in response to the pressure until it meets a stop which may be set to hold the molded piece to 1¾ inches in thickness, for example.

(G) Relieve the pressure, remove the mold from the press, and allow it to cool to about 100° F. At this point, remove the molded piece from the mold. Typically, the piece has a density of about 23 pounds per cubic foot and is quite porous. It has sufficient strength so that it requires no special handling in the operations which follow, and it can easily be machined into simple shapes.

(H) Place the piece on a 9" x 9" x ¾" mullite batt which has been evenly covered with coarse tabular alumina, and place the assembly in a kiln.

(I) Increase the kiln temperature to 650° F. at a rate of about 100° F. per hour and hold it at that elevated temperature for about sixteen hours.

(J) Next, increase temperature to about 1300° F. at a rate of approximately 100° F. per hour and hold it at that temperature for about sixteen hours.

(K) Permit the kiln to cool for twenty-four hours and remove the fired piece.

(L) Machine the piece into a 6" x 6" x 1" block which will have a typical density of 38 pounds per cubic foot.

A sample of the material produced by the foregoing process was measured in a microwave dielectrometer. The dielectric constant of the material was 2.1 and loss tangent 0.005 at $8.6 \times 10^9$ cycles per second. Material so treated and fired may be submerged in water containing a dye in solution and subjected to a vacuum sufficient to cause the water to boil at ambient temperature. On releasing the vacuum and cutting open the block, it will be found that the dye has not penetrated the surface of the block because the block is no longer porous. More over, dielectric properties of the material within the block remain the same as before submersion.

EXAMPLE 2

The steps through step I outlined in Example 1 should be repeated for particles made of material of the following composition:

| Oxide: | Weight Percent |
|---|---|
| $SiO_2$ | 68 |
| $PbO$ | 15 |
| $Na_2O$ | 10 |
| $K_2O$ | 6 |
| $CaO$ | 1 |

In step J, the temperature should be raised to a point in the range of 1300° F. to 1700° F. In this instance, and again with reference to the above-cited ASTM Designation C 338–54 T, the softening point of the material is approximately 1166° F. The working point, as defined previously, is about 1787° F.

EXAMPLE 3

The steps through step I outlined in Example 1 should be repeated for particles made of material of the following composition:

| Oxide: | Weight Percent |
|---|---|
| $SiO_2$ | 80 |
| $B_2O_3$ | 14 |
| $Na_2O$ | 4 |
| $Al_2O_3$ | 2 |

In step J, the temperature should be raised to a point in the range of 1600° F. to 2000° F. In this instance, the softening point of the material is approximately 1445° F. The working point is about 2084° F.

The achievement of non-porosity in the articles of the present invention is believed to be due principally to the firing properly prepared material at temperatures somewhat in excess of the softening point of the material. The coalescence of the particles into non-porous closed-cell material cannot be achieved by, for example, simply bonding the particles to some inert binder at temperatures below the softening point of the material of the glass spheres. Similarly, firing of the material at temperatures in excess of the working point of the material will not produce the desired non-porous closed-cell structure.

This invention is not limited to use with the specific spherical particles mentioned. Molded blocks prepared from hollow spheres of other inorganic film-forming materials will also yield non-porous articles when properly processed. The ultimate firing temperature should be somewhat higher than the softening temperature of the particular material employed, and it should be maintained for a sufficient length of time for the particles to fuse together. The upper temperature limit is set sufficiently low that the working point of the material is not exceeded substantially or for an extended period.

The temperatures given in the examples for the ultimate firing are those required for "slow firing" of the materials. Non-porous structures can also be obtained, as noted above, by employing "quick firing" at higher temperatures for shorter times. In general, however, although quick firing at or near the upper limits is possible in the practice of the present invention, slow firing is preferred. In any event, the firing temperature should be close to or within the limits of the range between the softening and working points of the material.

Also, the examples given refer to specific inorganic materials. When, noted above, particles of other inorganic materials are used, based upon material softening points, gas evolution, fusing, and the like, some adjustment of temperatures, pressures and time schedules is necessary. Such adjustments will be obvious to those skilled in the art once they have read the foregoing disclosure. Therefore, the invention should be limited not to the precise embodiments and examples disclosed, but only by the spirit and scope of the appended claims.

What is claimed its:

1. The method of manufacturing a cellular, non-porous article from closed-cell hollow particles of glass having a softening point of about 1500° F. and a working point of about 1700° F., which comprises the steps of blending said particles with water to form a uniformly damp mixture in a mold into a mass of predetermined shape, removing said mass from said mold, raising the temperature of said mass to approximately 650° F. and maintaining said mass at approximately 650° F. for an effective time, increasing the temperature of said mass to a point between 1300° F. and 1700 F., maintaining said mass at said point until said particles of said mass are fused together to form closed cells larger than said particles and kiln-cooling said mass to form said non-porous article.

2. The method of manufacturing a cellular, non-porous article from closed-cell hollow particles of glass which comprises the steps of blending said particles with water to form a uniformly damp mixture, placing said mixture in a mold, applying a pressure of approximately several hundred pounds per square inch to said mixture in said mold, heating said mold to a temperature of approximately 375° F. for an effective period to compact said mixture into a mass of shape determined by said mold, removing said compacted mass from said mold, heating said compacted mass to a temperature of approximately 650° F., maintaining said compacted mass at approximately 650° F. for an effective time, firing said compacted mass at a temperature between the softening temperature and the working temperature of said material for a period effective to coalesce said particles into individual closed cells of larger size than said particles and kiln-cooling said compacted mass to form said non-porous article.

3. The method of manufacting a cellular, non-porous article from closed-cell glass particles which comprises the steps of blending said particles with water until a uniformly damp mixture is obtained, placing said mixture in a mold, applying a pressure of approximately several hundred p.s.i. and heat of about 375° F. to said mixture to form a compacted mass, heating said compacted mass to approximately 650° F. for an effective time, firing said compacted mass at a temperature of approximately 1300° F. for a time effective to coalesce said particles into individual closed cells of larger size than said particles and kiln-cooling said fired mass to form said non-porous article.

4. The method of manufacturing a cellular, non-porous article from closed-cell glass particles of:

| Oxide: | Weight Percent |
|---|---|
| $SiO_2$ | 68 |
| $PbO$ | 15 |
| $Na_2O$ | 10 |
| $K_2O$ | 6 |
| $CaO$ | 1 | which comprises the steps of blending said particles with water until a uniformly damp mixture is obtained, molding said mixture into a compacted mass by applying pressure of approximately several hundred pounds p.s.i. and heat of about 375° F. to said mixture in a mold, removings said compacted mass from said mold, heating said compacted mass to approximately 650° F. for an effective time, firing said compacted mass at a temperature of approximately 1300° F. to 1700° F. for a period of about sixteen hours and kiln-cooling said fired mass to form said non-porous article.

5. The method of manufacturing a cellular, non-porous article from closed-cell particles of:

| Oxide: | Weight Percent |
|---|---|
| $SiO_2$ | 80 |
| $B_2O_3$ | 14 |
| $Na_2O$ | 4 |
| $Al_2O_3$ | 2 | which comprises the steps of blending said particles with water until a uniformly damp mixture is obtained, molding said mixture into a compacted mass by applying pressure of approximately several hundred pounds p.s.i. and heat of about 375° F. to said mixture in a mold, removing said compacted mass from said mold, heating said compacted mass at a temperature of approximately 650° F., maintaining said compacted mass at said temperature of approximately 650° F. for an effective time, firing said compacted mass at a temperature of approximately 1600° F. to 2000° F. for a time effective to coalesce said hollow particles into groups of cells of larger size than said hollow particles in said compacted mass, and kiln-cooling said fired mass to form said cellular, non-porous article.

6. A foamed article comprising hollow glass particles of relatively small size, groups of which have coalesced into groups of cells of relatively large size forming a non-porous mass having a dielectric constant of less than 2.5 and a loss tangent of less than 0.015 in the frequency range of $10^9$ to $10^{10}$ cycles per second and being capable of withstanding temperatures of about 1000° F., said article being shaped and contoured to form a container for food.

References Cited

UNITED STATES PATENTS

| | | | |
|---|---|---|---|
| 2,978,340 | 4/1961 | Veatch et al. | 106—54 X |
| 3,086,898 | 4/1963 | Alford et al. | 106—54 X |
| 3,163,512 | 12/1964 | Schill et al. | 106—54 X |

HELEN M. McCARTHY, *Primary Examiner.*

W. R. SATTERFIELD, *Assistant Examiner.*

U.S. Cl. X.R.

65—18; 106—39, 40, 52; 264—66, 125